(12) United States Patent
Frenger et al.

(10) Patent No.: US 10,219,294 B2
(45) Date of Patent: Feb. 26, 2019

(54) DATA TRANSMISSION ON A CONTENTION BASED PHYSICAL DATA CHANNEL

(71) Applicant: Telefonaktiebolaget LM Ericsson (publ), Stockholm (SE)

(72) Inventors: Pål Frenger, Linköping (SE); Emil Björnson, Linköping (SE); Martin Hessler, Linköping (SE); Erik G. Larsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 260 days.

(21) Appl. No.: 15/107,796

(22) PCT Filed: Jun. 3, 2016

(86) PCT No.: PCT/SE2016/050536
§ 371 (c)(1),
(2) Date: Jun. 23, 2016

(87) PCT Pub. No.: WO2017/209672
PCT Pub. Date: Dec. 7, 2017

(65) Prior Publication Data
US 2018/0199370 A1    Jul. 12, 2018

(51) Int. Cl.
*H04W 72/14* (2009.01)
*H04W 74/08* (2009.01)
*H04L 5/00* (2006.01)
*H04L 1/16* (2006.01)

(52) U.S. Cl.
CPC .......... *H04W 72/14* (2013.01); *H04L 1/1692* (2013.01); *H04L 5/0048* (2013.01); *H04L 5/0055* (2013.01); *H04W 74/0808* (2013.01)

(58) Field of Classification Search
None
See application file for complete search history.

(56) References Cited

U.S. PATENT DOCUMENTS

2011/0263286 A1    10/2011    Damnjanovic et al.

FOREIGN PATENT DOCUMENTS

WO    2016010217 A1    1/2016

OTHER PUBLICATIONS

Bjornson, Emil et al., "Random Access Protocol for Massive MIMO: Strongest-User Collision Resolution (SUCR)", Mar. 11, 2016, 1-6.

*Primary Examiner* — Diane L Lo
(74) *Attorney, Agent, or Firm* — Murphy, Bilak & Homiller, PLLC (57) ABSTRACT

There is provided mechanisms for data transmission on a contention based physical data channel (PDCH). The method is performed by a wireless device. The method comprises sending a first data transmission on the contention based PDCH to an access node. The method comprises receiving a response to the first data transmission from the access node. The method comprises determining a signal strength of the response. The method comprises acting as the first data transmission either was collision-free or collided with another data transmission of another wireless depending on a comparison between the signal strength and a threshold defined by an expected signal strength of the response.

32 Claims, 6 Drawing Sheets

DATA TRANSMISSION ON A CONTENTION BASED PHYSICAL DATA CHANNEL

TECHNICAL FIELD

Embodiments presented herein relate to methods, a wireless device, an access node, computer programs, and a computer program product for data transmission on a contention based physical data channel.

BACKGROUND

In communications networks, there may be a challenge to obtain good performance and capacity for a given communications protocol, its parameters and the physical environment in which the communications network is deployed.

For example, one difficulty in delivering high data rates in wireless communications networks is the natural variability of the radio propagation channels. Power control and adaptive modulation and coding are classical methods that adapt the signal quality and data rates to the current radio channel conditions. Such methods can be used to combat channel fading to achieve a constant data rate. Alternatively, the instantaneous data rate can be adapted to the instantaneous channel fading, to send more data when the channel has favorable conditions and less when it is unfavorable. These methods can be applied both over time and over frequency subcarriers. The power and modulation adaptation generally need to be re-determined over the same time/frequency scale as the channel varies. Since substantial channel variations can occur over a few milliseconds and a few hundred kHz, this calls for cumbersome channel estimation and feedback mechanisms.

Access nodes, such as radio base stations, equipped with a large number of antennas can simultaneously schedule multiple wireless devices at the same time/frequency band and communicate using linear processing such as maximum-ratio (MR) and zero-forcing (ZF). This is an approach to handle data traffic does not require a denser network deployment and each access node can control the interference that it causes to its local area. Using many antennas at the access node along with appropriately chosen precoding results in an effective channel between the access node and the wireless device that is substantially independent of the small-scale fading and appears flat over frequency. This property is often referred to as channel hardening. Communications networks having nodes with many antennas are often referred to as massive multi-user multiple-input-multiple-output (MIMO), abbreviated by massive MIMO or MA-MIMO hereafter.

Figure 1:
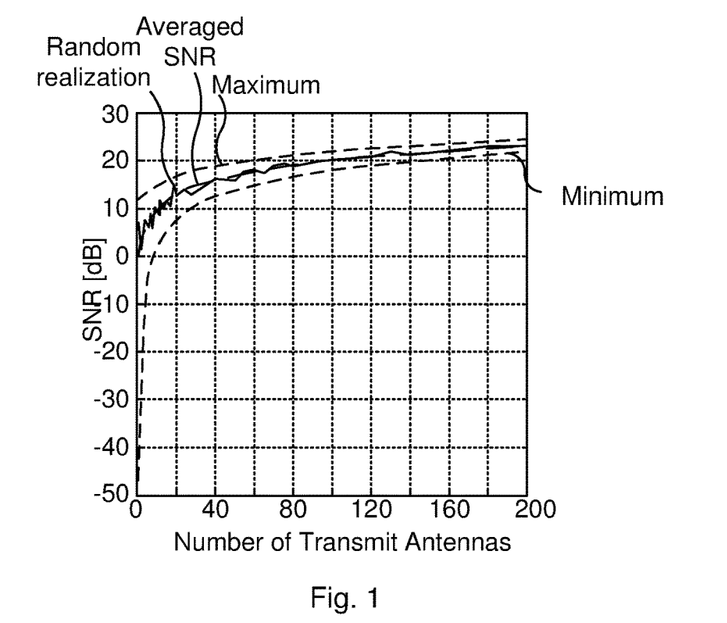
FIG. 1 is a schematic illustration of received SNR as a function of number of transmit antennas.

To see the impact of the number of antennas on the channel variations, consider a multiple-input single-output (MISO) system with an access node having M transmit antennas and using MR precoding. Mathematically, the received signal at the wireless device can be expressed as $$y = \sqrt{P} h^T w s + e,$$

where P is the transmitted power, h denotes the M×1 channel vector, $$w = \frac{h^*}{\|h\|}$$

is the M×1 MR precoding vector, s is the unit-energy transmitted symbol, and e is zero-mean additive white Gaussian noise with variance $\sigma^2$. It can be shown that the average received SNR scales as M. However, the SNR variations around the mean depend heavily on the number of antennas M and decreases as M increases. This can be seen from FIG. 1 where the average received Signal to Noise Ratio (SNR) as well as the maximum and the minimum received SNR for 100000 random channel realizations are plotted versus the number of antennas. In FIG. 1, the average SNR per antenna is set to 0 dB, i.e., $$\frac{P}{\sigma^2} = 1$$

and an independent Rayleigh fading channel where the elements of h are circularly symmetric complex Gaussian random variables with zero mean and unit variance is assumed. For illustration, the instantaneous received SNR for a random channel realization is also plotted. From FIG. 1 follows that the average SNR increases linearly as M increases, and moreover the SNR variations around the mean decrease with M. Similar observations can be made for ZF precoding. This confirms the fact that in communications network deploying nodes with massive number of antennas, the channel after exploiting a good precoder is almost flat and does not vary with time or frequency.

The channel hardening property can be utilized to simplify the power control and selection of modulation and coding, since the same choice can be used for all available frequencies and over a relatively long time period (depending on the user mobility). This is one of the benefits of massive MIMO over conventional radio access technologies.

One key advantage with massive MIMO systems is that wireless devices can be separated spatially. Hence there is a potential to let wireless devices send uplink data in a non-coordinated fashion. This can lower overhead and give advantages in latency. However, a massive MIMO system can only separate the wireless devices if the wireless devices are assigned orthogonal pilot signals. If all wireless devices are assigned unique pilot signals a very large overhead is created. Hence, according to state of the art, pilot signals are reused, i.e., the same pilot signal is assigned to at least two wireless devices. This leads to a collision probability. Using state of the art methods these collisions result in a loss of resources. For example are the data symbols lost and the collision probability of multiple collisions is handled by using a back-off timer giving an increase in latency.

Hence, there is still a need for an improved handling of wireless devices sending uplink data in a non-coordinated fashion.

SUMMARY

An object of embodiments herein is to provide efficient handling of wireless devices sending uplink data in a non-coordinated fashion.

According to a first aspect there is presented a method for data transmission on a contention based physical data channel (PDCH). The method is performed by a wireless device. The method comprises sending a first data transmission on the contention based PDCH to an access node. The method comprises receiving a response to the first data transmission from the access node. The method comprises determining a signal strength of the response. The method comprises acting as the first data transmission either was collision-free or collided with another data transmission of another wireless depending on a comparison between the signal strength and a threshold defined by an expected signal strength of the response.

According to a second aspect there is presented a wireless device for data transmission on a contention based PDCH. The wireless device comprises processing circuitry. The processing circuitry is configured to cause the wireless device to send a first data transmission on the contention based PDCH to an access node. The processing circuitry is configured to cause the wireless device to receive a response to the first data transmission from the access node. The processing circuitry is configured to cause the wireless device to determine a signal strength of the response. The processing circuitry is configured to cause the wireless device to act as the first data transmission either was collision-free or collided with another data transmission of another wireless depending on a comparison between the signal strength and a threshold defined by an expected signal strength of the response.

According to a third aspect there is presented a wireless device for data transmission on a contention based PDCH. The wireless device comprises processing circuitry and a computer program product. The computer program product stores instructions that, when executed by the processing circuitry, causes the wireless device to perform steps, or operations. The steps, or operations, cause the wireless device to send a first data transmission on the contention based PDCH to an access node. The steps, or operations, cause the wireless device to receive a response to the first data transmission from the access node. The steps, or operations, cause the wireless device to determine a signal strength of the response. The steps, or operations, cause the wireless device to act as the first data transmission either was collision-free or collided with another data transmission of another wireless depending on a comparison between the signal strength and a threshold defined by an expected signal strength of the response.

According to a fourth aspect there is presented a wireless device for data transmission on a contention based PDCH. The wireless device comprises a send module configured to send a first data transmission on the contention based PDCH to an access node. The wireless device comprises a receive module configured to receive a response to the first data transmission from the access node. The wireless device comprises a determine module configured to determine a signal strength of the response. The wireless device is configured to act as the first data transmission either was collision-free or collided with another data transmission of another wireless depending on a comparison between the signal strength and a threshold defined by an expected signal strength of the response.

According to a fifth aspect there is presented a computer program for data transmission on a contention based PDCH, the computer program comprising computer program code which, when run on processing circuitry of a wireless device, causes the wireless device to perform a method according to the first aspect.

According to a sixth aspect there is presented a method for data transmission on a contention based PDCH. The method is performed by an access node. The method comprises receiving a first data transmission on the contention based PDCH from at least one wireless device. The method comprises sending a single response to the first data transmission to the at least one wireless device. The method comprises receiving a second data transmission on the contention based PDCH from the at least one wireless device. The method comprises determining a correlation between the first data transmission and the second data transmission. The method comprises acting as if the first data transmission was either received from only a single wireless device or from at least two wireless devices depending on a comparison between the correlation and a threshold.

According to a seventh aspect there is presented an access node for data transmission on a contention based PDCH. The access node comprises processing circuitry. The processing circuitry is configured to cause the access node to receive a first data transmission on the contention based PDCH from at least one wireless device. The processing circuitry is configured to cause the access node to send a single response to the first data transmission to the at least one wireless device. The processing circuitry is configured to cause the access node to receive a second data transmission on the contention based PDCH from the at least one wireless device. The processing circuitry is configured to cause the access node to determine a correlation between the first data transmission and the second data transmission. The processing circuitry is configured to cause the access node to act as if the first data transmission was either received from only a single wireless device or from at least two wireless devices depending on a comparison between the correlation and a threshold.

According to an eighth aspect there is presented an access node for data transmission on a contention based PDCH. The access node comprises processing circuitry and a computer program product. The computer program product stores instructions that, when executed by the processing circuitry, causes the access node to perform steps, or operations. The steps, or operations, cause the access node to receive a first data transmission on the contention based PDCH from at least one wireless device. The steps, or operations, cause the access node to send a single response to the first data transmission to the at least one wireless device. The steps, or operations, cause the access node to receive a second data transmission on the contention based PDCH from the at least one wireless device. The steps, or operations, cause the access node to determine a correlation between the first data transmission and the second data transmission. The steps, or operations, cause the access node to act as if the first data transmission was either received from only a single wireless device or from at least two wireless devices depending on a comparison between the correlation and a threshold.

According to a ninth aspect there is presented an access node for data transmission on a contention based PDCH. The access node comprises a receive module configured to receive a first data transmission on the contention based PDCH from at least one wireless device. The access node comprises a send module configured to send a single response to the first data transmission to the at least one wireless device. The access node comprises a receive module configured to receive a second data transmission on the contention based PDCH from the at least one wireless device. The access node comprises a determine module configured to determine a correlation between the first data transmission and the second data transmission. The access node is configured to act as if the first data transmission was either received from only a single wireless device or from at least two wireless devices depending on a comparison between the correlation and a threshold.

According to a tenth aspect there is presented a computer program for data transmission on a contention based PDCH, the computer program comprising computer program code which, when run on processing circuitry of an access node, causes the access node to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium can be a non-transitory computer readable storage medium.

Advantageously these methods, these wireless devices, these access nodes, and these computer programs enables efficient handling of wireless devices sending uplink data in a non-coordinated fashion.

Advantageously this enables latency to be lowered in MA-MIMO systems compared to when methods according to state of the art are used.

Advantageously this enables the use of a contention channel in scenarios where methods according to state of the art currently prevents the use of a contention based channel.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 2:
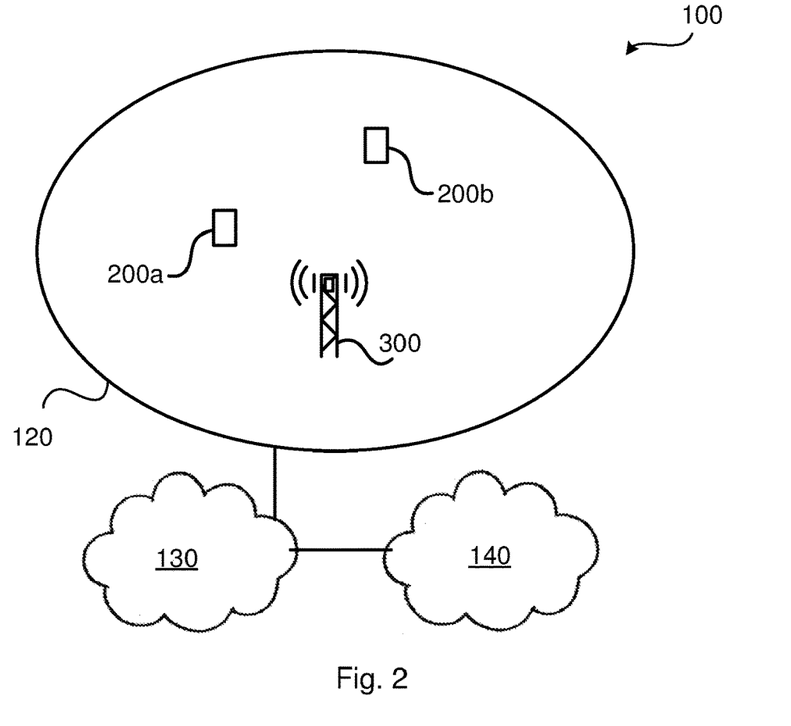
FIG. 2 is a schematic diagram illustrating a communication network according to embodiments.

FIG. 2 is a schematic diagram illustrating a communications network 100 where embodiments presented herein can be applied. The communications network 100 comprises at least one access node 300.

Functionality of the access node 200 could be implemented in a radio base station, a base transceiver station, a NodeBs, an evolved NodeB, or an access point. The at least one access node 300 is part of a radio access network 120 and operatively connected to a core network 130 which in turn is operatively connected to a service network 140. The at least one access node 300 provides network access in the radio access network 120. Further functionality of the access node 200 and how it interacts with other entities, nodes, and devices in the communications network 100 will be further disclosed below.

A wireless device 200a, 200b served by the at least one access node 300 is thereby enabled to access services and exchange data with the core network 130 and the service network 140. Examples of wireless devices 200a, 200b include, but are not limited to, mobile stations, mobile phones, handsets, wireless local loop phones, user equipment (UE), smartphones, laptop computers, tablet computers, network equipped sensors, wireless modems, and Internet of Things devices.

As the skilled person understands, the communications network 100 may comprise a plurality of access nodes 200, each providing network access to a plurality of wireless devices 200a, 200b. The herein disclosed embodiments are no limited to any particular number of access nodes 200 or wireless devices 200a, 200b.

The embodiments disclosed herein relate to mechanisms for data transmission on a contention based PDCH. In order to obtain such mechanisms there is provided a wireless device 200a, a method performed by the wireless device 200a, a computer program product comprising code, for example in the form of a computer program, that when run on processing circuitry of the wireless device 200a, causes the wireless device 200a to perform the method. In order to obtain such mechanisms there is further provided an access node 300, a method performed by the access node 300, and a computer program product comprising code, for example in the form of a computer program, that when run on processing circuitry of the access node 300, causes the access node 300 to perform the method.

For simplicity it is in some embodiments assumed that the communications network 100 operates in time-division duplex (TDD) mode and that the uplink transmission includes a reference signal such as an uplink demodulation reference signal (UL-DMRS). Further, the contention based channel with is a contention based Physical Data Channel (PDCH). Then the received channel can be estimated using the UL-DMRS.

Using the UL-DMRS the access node 300 can estimate the channel of the transmission from the wireless devices 200a, 200b and use this channel estimate to demodulate and decode the transmission. From the point of view of the access node 300 no difference might be made according to if the channel is from one or more wireless devices 200a, 200b.

If the access node 300 successfully decodes the data transmission from one of the wireless devices 200a, 200b the access node 300 can be configured to send an ACK protocol message and if the access node 300 fails to decode the data transmission it can be configured to send a NACK protocol message according to a known Hybrid automatic repeat request (HARQ) feedback procedure. For example, the access node 300 can use uses maximum ratio transmission (MRT) precoding for the ACK and NACK protocol messages.

In case of data transmissions from two or more wireless devices 200a, 200b colliding, the estimate of the channel will contain a combination of the channels to the colliding wireless devices 200a, 200b. In that case the precoding will effectively entail multicasting to the wireless devices 200a, 200b involved in the collision.

When the wireless device receives the HARQ-feedback for the data transmission the wireless devices 200a can estimate the expected receive energy and estimate if the actual received energy is according to this estimate or not. If the received energy is sufficiently high (above a threshold) the wireless device 200a could act according to the HARQ transmission, e.g. assume correct reception if the HARQ transmission comprises an ACK protocol message and perform a retransmission of the data transmission if the HARQ transmission comprises a NACK protocol message according to the procedure associated to the first pilot signal used by the wireless device 200a for the original data transmission. If the received energy is below a threshold then the wireless device 200a could act as if the original data transmission collided. The wireless device 200a could then retransmit the data transmission using a new pilot signal.

Particular embodiments relating to the above aspects will now be presented.

Figures 3, 4:
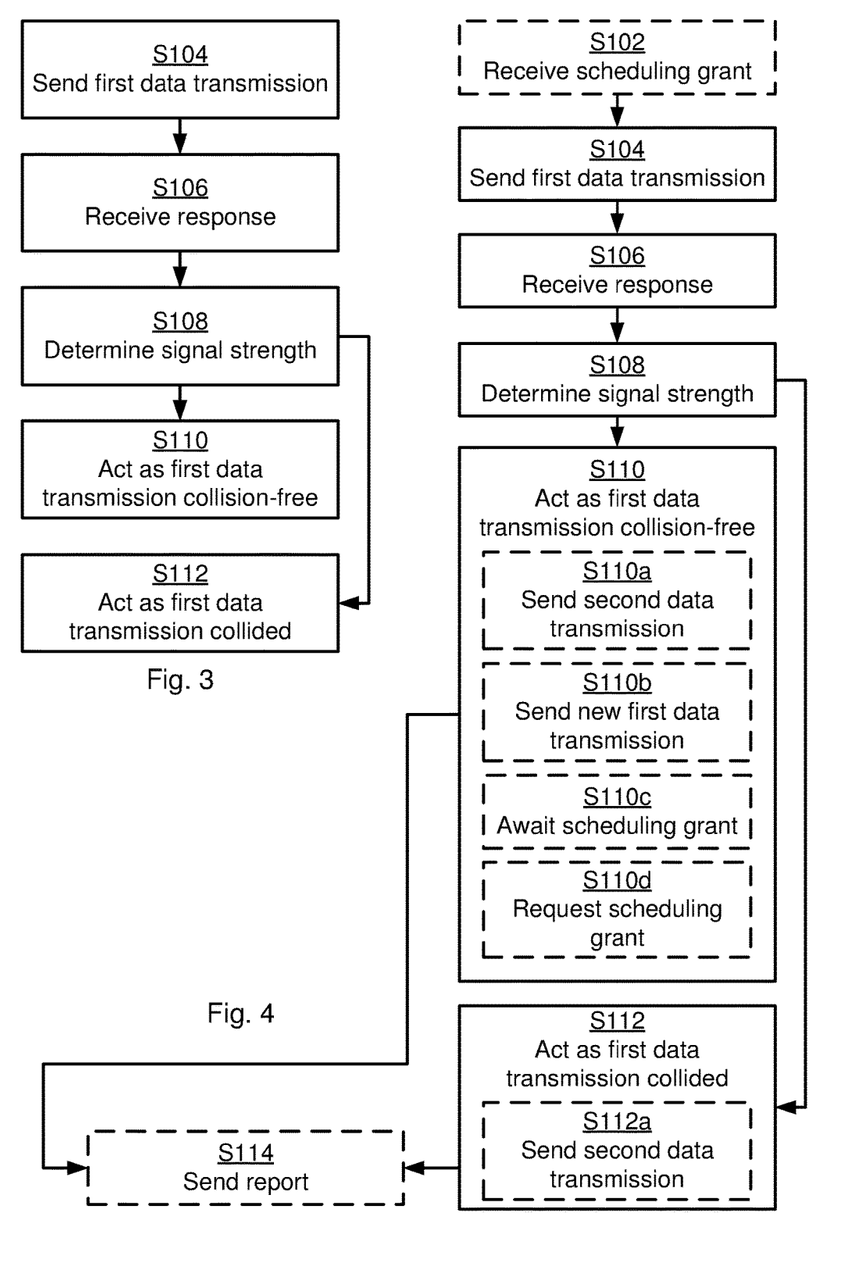
FIGS. 3, 4, 5, and 6 are flowcharts of methods according to embodiments.
Figures 5, 6:
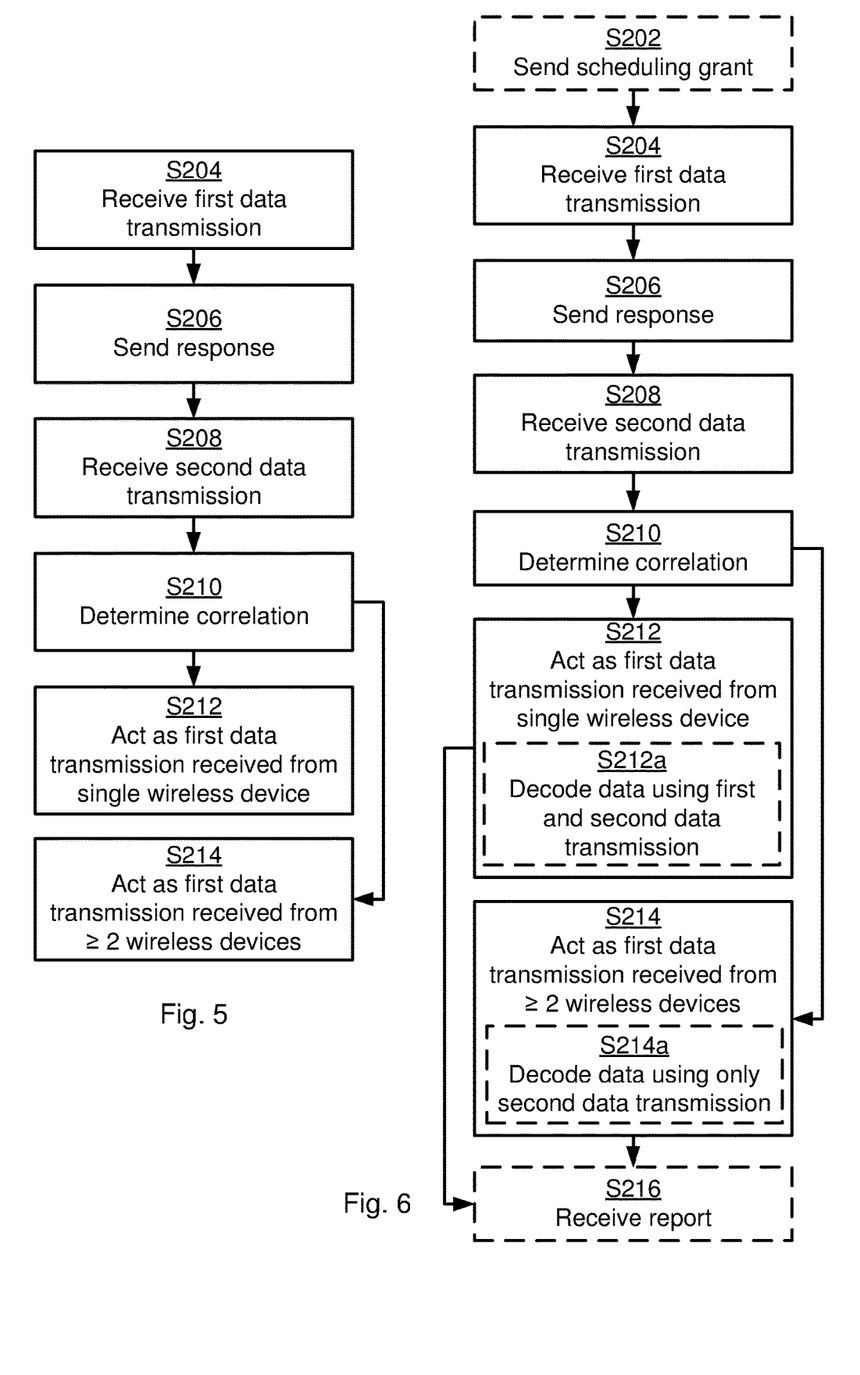

FIGS. 3 and 4 are flow charts illustrating embodiments of methods for data transmission on a contention based PDCH as performed by the wireless device 200a. FIGS. 5 and 6 are flow charts illustrating embodiments of methods for data transmission on a contention based PDCH as performed by the access node 300. The methods are advantageously provided as computer programs 420a, 420b.

Figure 7:
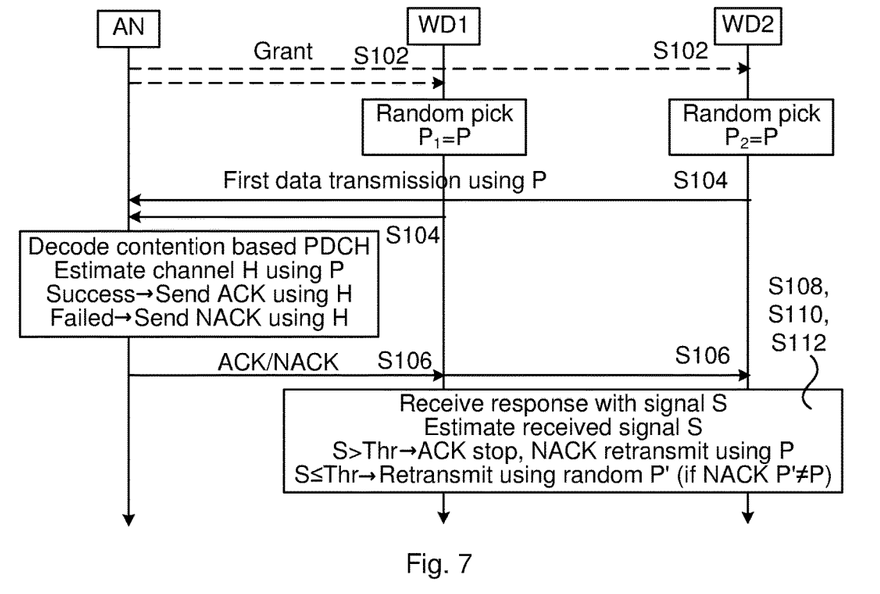
FIGS. 7, 8, and 9 are signalling diagrams according to embodiments.

Reference is now made to FIG. 3 illustrating a method for data transmission on a contention based PDCH as performed by the wireless device 200a according to an embodiment. Parallel reference is made to the signalling diagram of FIG. 7 in which the notation AN is short for access node, WD1 is short for wireless device 200a, and WD2 is short for wireless device 200b. In FIG. 7 the access node 300 acts according to state of the art and is thus not aware of the potential collision of the data transmissions from the wireless devices 200a, 200b.

S104: The wireless device 200a sends a first data transmission on the contention based PDCH to an access node 300.

It is assumed that the access node 300 receives this first data transmission and provides a response thereto. According to the embodiment in FIG. 7 the access node 300 attempts to decode the received contention based PDCH on which the first data transmission is sent. If successful decoding the response is an ACK protocol message and if unsuccessful decoding the response is a NACK protocol message. Embodiments relating to alternative steps the access node 300 might take when receiving the first data transmission will be disclosed below. Hence the wireless device 200a is configured to perform step S106:

S106: The wireless device 200a receives a response to the first data transmission from the access node 300.

In response to having received the response the wireless device 200a performs a signal strength measurement on the received signal in order to determine whether the response was intended for the wireless device 200a or not. Hence the wireless device 200a is configured to perform step S108:

S108: The wireless device 200a determines a signal strength of the response.

Upon having determined the signal strength the wireless device 200a then acts differently depending on whether the response was intended for the wireless device 200a or not. In order to do so the wireless device 200a determines whether the response was intended for the wireless device 200a or not by making a comparison of the signal strength of the response with an expected signal strength of the response. Hence the wireless device 200a is configured to perform steps S110, S112:

S110, S112: The wireless device 200a as either the first data transmission was collision-free (step S110) or collided with another data transmission of another wireless 200b (step S112) depending on a comparison between the signal strength and a threshold defined by an expected signal strength of the response. Hence it is the result of the comparison that makes the wireless device 200a act as the first data transmission either was collision-free or collided with another data transmission of another wireless 200b.

The expected signal strength of the response is known to the wireless device 200a by, for example, the wireless device 200a estimating the path gain to the access node 300, by explicitly knowing the output power used by the access node 300, and/or by explicitly knowing that the access node 300 performs power control on the contention based PDCH.

In this respect the wireless device 200a can act as if the first data transmission was collision-free (step S110) when the signal strength is higher than the threshold. Further in this respect the wireless device 200a can otherwise act as if the first data transmission collided with another data transmission of another wireless 200b (step S112), i.e., when the signal strength is not higher than the threshold.

According to some aspects the first data transmission comprises a pilot. In FIG. 7 both WD1 and WD2 has respective pilots P1, P2 which both are selected to the same value (denoted P). Particularly, according to an embodiment the first data transmission comprises a first pilot signal acting as a reference symbol. There could be different examples of pilot signals and reference signals. According to an embodiment the first pilot signal is a demodulation reference signal, DM-RS.

There could be different ways for the wireless device 200a to determine the signal strength of the response. According to an embodiment the response comprises a precoder signal. The precoder signal is selected by the access node 300 depending on the first pilot signal. Hence, the precoder signal is dependent on the first pilot signal. The signal strength is then by the wireless device 200 determined for the precoder signal.

Reference is now made to FIG. 4 illustrating methods for data transmission on a contention based PDCH as performed by the wireless device 200a according to further embodiments. It is assumed that steps S104-S112 are performed as described above and a thus repeated description thereof is therefore omitted. Parallel reference is continued to the signalling diagram of FIG. 7.

There may be different reasons for the wireless device 200 to send the first data transmission in step S104. According to some aspects the first data transmission is sent after the wireless device 200 has received a scheduling grant. Hence according to an embodiment the wireless device 200a is configured to perform step S102:

S102: The wireless device 200a receives, from the access node 300, a scheduling grant for the wireless device 200a to transmit data on the contention based PDCH. The first data transmission is by the wireless device 200a sent according to the scheduling grant.

The response as received in step S106 could be either an ACK protocol message of the first data transmission or a NACK protocol message of the first data transmission. As will be demonstrated next, how to act in step S110 might then also be dependent on whether the response is an ACK protocol message or a NACK protocol message.

According to an embodiment the response is a NACK protocol message. Hence, the first data transmission was unsuccessful. The wireless device 200a is then according to an embodiment configured to perform step S110a (as part of step S110) when acting as if the first data transmission was collision-free:

S110a: The wireless device 200a re-sends the first data transmission as a second data transmission on the contention based PDCH to the access node 300. According to an embodiment the second data transmission comprises the first pilot signal.

According to an embodiment the response is an ACK protocol message. Hence, the first data transmission was successful. The wireless device 200a is then according to an embodiment configured to perform any of steps S110b, S110c, S110d (as part of step S110) when acting as if the first data transmission was collision-free:

S110b: The wireless device 200a sends another first data transmission on the contention based PDCH to the access node 300a according to the scheduling grant.

S110c: The wireless device 200a awaits another scheduling grant from the access node 300 for the wireless device 200a to transmit data on the contention based PDCH.

S110d: The wireless device 200a requests another scheduling grant from the access node 300 for the wireless device 200a to transmit data on the contention based PDCH.

Embodiments relating to where the first data transmission collided will now be disclosed.

According to some aspects the wireless device 200b re-sends the first data transmission upon having determined that the first data transmission collided. In this case the wireless device 200b knows that the first data transmission was not successfully received by the access node 300. Hence, the wireless device 200a is according to an embodiment configured to perform step S112a (as part of step S112) when acting as if the first data transmission collided:

S112a: The wireless device 200b re-sends the first data transmission as a second data transmission on the contention based PDCH to the access node 300 according to the scheduling grant. The data might be re-sent with a new pilot. Hence, according to an embodiment the second data transmission comprises a second pilot signal having a different value than the first pilot signal (i.e., the pilot signal of the first data transmission).

There could be different examples of the second pilot signal. According to a first embodiment the value of the second pilot signal is randomly selected, is determined according to the signal strength of the response, and/or is determined based on the first pilot signal. According to a second embodiment the value of the second pilot signal is predicted using the value of the first pilot signal and the signal strength of the response. According to a third embodiment the value of the second pilot signal has a transmission power determined in a range comprising a nominal value, and the transmission power is determined in mutually uncoordinated way between the wireless device 200a and at least one other wireless device 200b.

There can be further ways for the wireless device 200a to act upon reception of the response in step S106. For example, the wireless device 200 can report the reception quality to the access node 300. Hence according to an embodiment the wireless device 200a is configured to perform step S114:

S114: The wireless device 200b sends a report indicating the signal strength of the response to the access node 300. Step S114 is performed after step S106 but the order in which step S114 is performed in relation to steps S110 and S112 is arbitrary.

There can be different ways in which the report I step S114 is formulated For example, multiple thresholds can be used to indicate how close to the threshold the detected value was. Hence, according to an embodiment the report comprises an indication of a difference between the signal strength of the response and the threshold. Further, the report might indicate possible regions. Hence, according to an embodiment the indication is defined by a signal region, where the signal region is selected according to the difference.

Reference is now made to FIG. 5 illustrating a method for data transmission on a contention based PDCH as performed by the access node 300 according to an embodiment. Parallel reference is made to the signalling diagrams of FIGS. 8 and 9 in which the notation AN is short for access node, WD1 is short for wireless device 200a, and WD2 is short for wireless device 200b.

As disclosed above, the wireless device 200a in a step S104 sends a first data transmission to the access node 300. In this respect, the access node 300 might also receive another first data transmission from another wireless device 200a. Hence the access node 300 is configured to perform step S204:

S204: The access node 300 receives the first data transmission on the contention based PDCH from at least one wireless device 200a, 200b.

Upon having received the first data transmission the access node 300 sends a response. At this point the access node 300 cannot distinguish between the first data transmission being received from one wireless device 200a or two or more wireless devices 200a, 200b. The access node 300 therefore sends just a single response. Hence the access node 300 is configured to perform step S206:

S206: The access node 300 sends a single response to the first data transmission to the at least one wireless device 200a, 200b.

Here, it can be assumed that at least one of the wireless devices 200a, 200b receiving the response in turn transmits a seconds data transmission to the access node 300. Hence the access node 300 is configured to perform step S208:

S208: The access node 300 receives the second data transmission on the contention based PDCH from the at least one wireless device 200a, 200b.

Upon having received also the second data transmission the access node 300 can determine whether the first data transmission was received from only a single wireless device 200a or from at least two wireless devices 200a, 200b. In order to do so the access node 300a compares the first data transmission to the second data transmission. Hence the access node 300 is configured to perform step S210:

S210: The access node 300 determines a correlation between the first data transmission and the second data transmission.

Upon having determined the correlation the access node 300 then acts differently depending on whether the first data transmission was received from only a single wireless device 200a or from at least two wireless devices 200a, 200b. Hence the wireless device 200a is configured to perform steps S212, S214:

S212, S214: The access node 300 acts as if the first data transmission was either received from only a single wireless device 200a (step S212) or from at least two wireless devices 200a, 200b (step S214) depending on a comparison between the correlation and a threshold.

In this respect the access node 300 can act as if the first data transmission was received from only said single wireless device 200a (step S212) when the correlation is higher than the threshold. Further in this respect the access node 300 can act as if the first data transmission was received from at least two wireless devices 200a, 200b (step S214) when the correlation is not higher than the threshold.

As disclosed above, the response could either be an ACK protocol message or a NACK protocol message.

As disclosed above, the response could comprise a precoder being dependent on the first pilot signal.

There could be different ways for the access node 300 to determine the correlation in step S210. According to some aspects the correlation is based on channel estimates. Hence, according to an embodiment the correlation is based on a channel estimate of the first data transmission and a channel estimate of the second data transmission.

As disclosed above, the first data transmission in some embodiments comprises a first pilot signal acting as a reference symbol, and the second data transmission in some embodiments comprises a second pilot signal also acting as said reference symbol. The channel estimates could then be based on the pilots. Hence, according to an embodiment the channel estimate of the first data transmission is based on the first pilot signal, and the channel estimate of the second data transmission is based on the second pilot signal.

Reference is now made to FIG. 6 illustrating methods for data transmission on a contention based PDCH as performed by the access node 300 according to further embodiments. It is assumed that steps S204-S214 are performed as described above and a thus repeated description thereof is therefore omitted. Parallel reference is continued to the signalling diagrams of FIGS. 8 and 9.

As disclosed above, the access node 300 in some aspects sends a scheduling grant for the at least one wireless device 200a, 200b. Hence, according to an embodiment the access node 300 is configured to perform step S202:

S202: The access node 300 sends a scheduling grant for the at least one wireless device 200a, 200b to transmit data on the contention based PDCH.

The first data transmission and the second data transmission are then received (in steps S204, S208) according to the scheduling grant.

Embodiments relating to how the access node 300 can act when the first data transmission was received from only a single wireless device 200a (step S212) or from at least two wireless devices 200a, 200b (step S214) will now be disclosed. According to some aspects the first data transmission comprises data and the second data transmission also comprises the same data.

If the access node 300 determines that the first data transmission was received from only a single wireless device 200a, then the first data transmission and the second data transmission were received from the same wireless device 200a. The access node 300 can therefore use the first data transmission and the second data transmission when decoding the data. Hence, according to an embodiment the access node 300 is configured to perform step S212a (as part of step S212) when acting as if the first data transmission was received from the single wireless device 200a:

S212a: The access node 300 decodes the data using a combination of the data of the first data transmission and the data of the second data transmission.

If the access node 300 determines that the first data transmission was not received from only a single wireless device 200a, then the first data transmission and the second data transmission were at least partly received from different wireless devices 200a, 200b. The access node 300 therefore uses only the second data transmission when decoding the data. Hence, according to an embodiment the access node 300 is configured to perform step S214a (as part of step S214) when acting as if the first data transmission was received from at least two wireless devices 200a, 200b:

S214a: The access node 300 decodes the data using the data of the second data transmission and without using the data of the first data transmission.

As disclosed above, the wireless device 200a in an embodiment reports a signal strength of the response. Hence, according to an embodiment the access node 300 is configured to perform step S216:

S216: The access node 300 receives a report from at least one of the at least one wireless device 200a. The report indicates a signal strength of the response to the first data transmission. Step S216 is performed after step S204 but the order in which step S216 is performed in relation to steps S208-S214 is arbitrary.

Aspects of the above disclosed embodiments applicable to both the wireless device 200a and the access node 300 will now be presented.

In some aspects, the transmission power used in the uplink transmission is selected to improve the probability that one of the wireless devices 200a, 200b whose data transmissions might collide observe a downlink signal energy above its threshold. This functionality can for example be used in scenarios where many wireless devices 200a, 200b with similar channel gains to the access node 300a are simultaneously accessing the communications network 100, leading to a risk for repeated collisions where none of the colliding wireless devices 200a, 200b measures a signal energy above its threshold and thus might select a new pilot signal at random.

If the wireless devices 200a, 200b vary their uplink pilot signal transmission powers in an uncoordinated way around a nominal value (i.e., within a range comprising the nominal value), the probability that colliding wireless devices 200a, 200b have similar received signal levels at the access node 300 can be reduced. In this case the threshold at the wireless devices 300a can be selected to increase the chance that one of wireless devices 200a, 200b has a successful transmission, despite a collision.

In some aspects, the pilot signal for the retransmission (as used in step S112a) is predicted using the first pilot and the information in the HARQ feedback message (as can be received in the response in step S106). In such cases, full or partial use of the transmitted data symbols in the first transmission can be achieved if the herein disclosed steps S104-S112 and S204-S214 are performed within the coherence time of the channel.

This can be achieved by the access node 300 buffering the data of the first transmission. In the second data transmission the access node 300 receives a collision-free transmission and hence a collision-free channel estimate. Using the collision-free channel estimate the access node 300 can utilize the data from the first transmission as well as the data in the second transmission to demodulate and decode the data message from the wireless device 200a.

Figure 8:
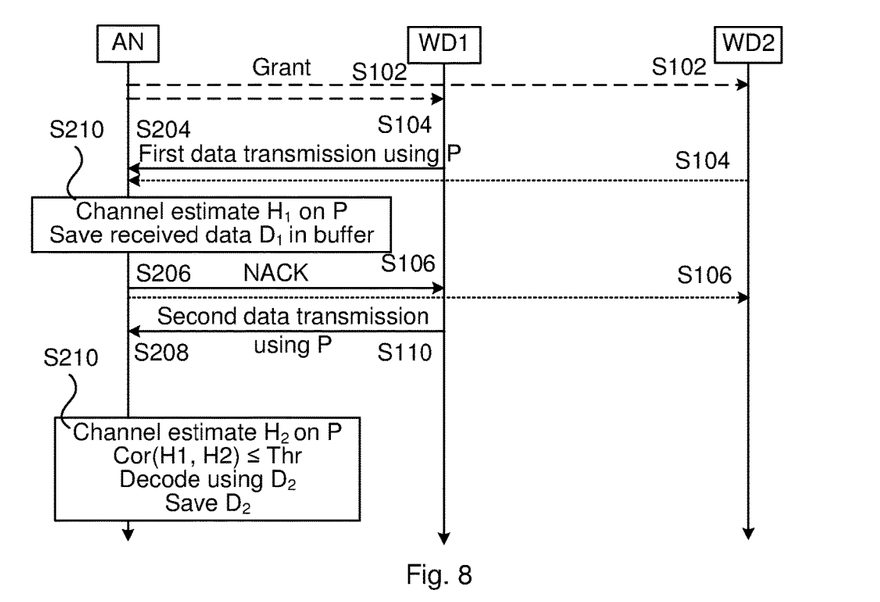
Figure 9:
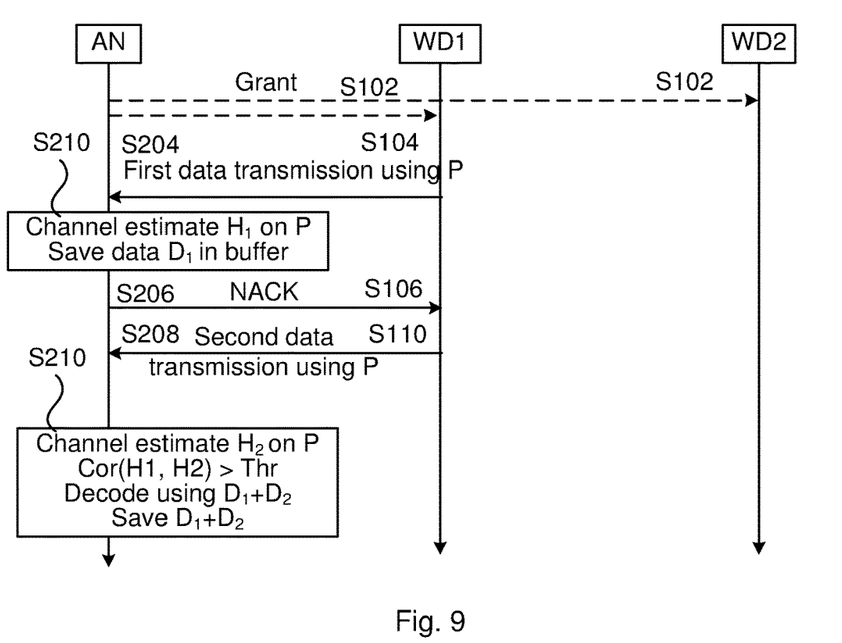

In some aspects an even more efficient buffer management procedure can be performed. This buffer management procedure can be used when there is a known relation between the first pilot signal and the second pilot signal. It can also be used even if the channel has de-correlated, thereby enabling the above disclosed steps S104-S112 and S204-S214 to be performed even outside the coherence time of the channel. This buffer management procedure involves to correlate the channel characteristic for the first channel estimate for the first transmission with the channel characteristic of the channel estimate for the second transmission. This is particularly illustrated in the signalling diagrams of FIGS. 8 and 9 where D1 denotes data of the first data transmission and D2 denotes data of the second data transmission. In FIG. 8 the access node 300 when determining that the correlation between channel estimate H1 (from the first data transmission) and channel estimate H2 (from the second data transmission) is not higher than the threshold knows that a collision occurred in the first data transmission and hence decodes the data using only D2. Additionally or alternatively, in FIG. 8 the access node 300 could decode the data using D1, for example by using H2 as estimate for H1 and using D2 as side information. In FIG. 9 the access node 300 when determining that the correlation between channel estimate H1 (from the first data transmission) and channel estimate H2 (from the second data transmission) is higher than the threshold knows that a collision has not occurred in the first data transmission and hence decodes the data using D1 and D2.

Figure 10:
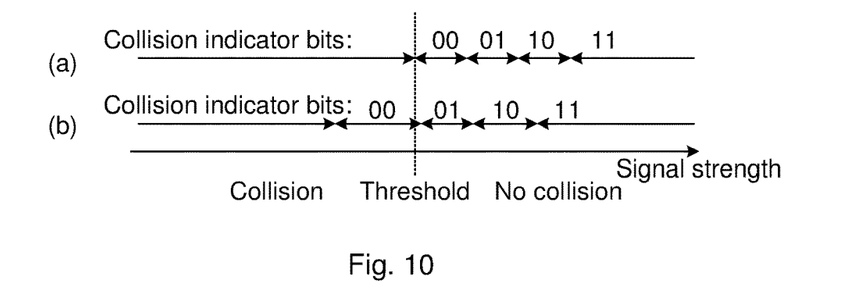
FIG. 10 schematically illustrates detection thresholds for collision detection according to embodiments.

In some aspects the wireless device 200a reports the reception quality of the HARQ (i.e., of the response received in step S106), thereby giving access node 300 the option to react to a suspected collision. If the access node 300 wants to avoid further collisions the access node 300 can make a scheduling or rescheduling of resources to enable contention free access for wireless devices 200a, 200b suspected to be involved in collision(s). As disclosed above, the report could be formed in different formats; one example is to use multiple thresholds to indicate how close to the threshold the detected value was, for example to use 2 bits to indicate 4 possible regions. This is illustrated in FIG. 10, where the bit sequences "00", "01", "10", and "11" are used to identify such regions. The thresholds could, for example, be defined according to a probability of collision, or according to the signal to interference plus noise ratio (SINR) of the detection variable, etc. In some examples only values above threshold, as in FIG. 10(a), are reported, and in some examples also values below threshold are reported, as in FIG. 10(b).

Figure 11:
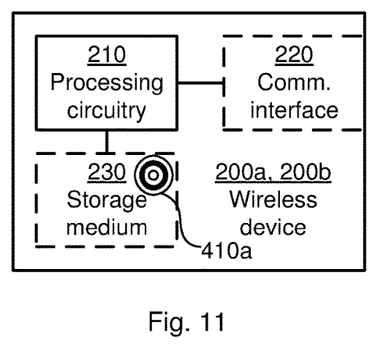
FIG. 11 is a schematic diagram showing functional units of a wireless device according to an embodiment.

FIG. 11 schematically illustrates, in terms of a number of functional units, the components of a wireless device 200a according to an embodiment. Processing circuitry 210 is provided using any combination of one or more of a suitable central processing unit (CPU), multiprocessor, microcontroller, digital signal processor (DSP), etc., capable of executing software instructions stored in a computer program product 410a (as in FIG. 15), e.g. in the form of a storage medium 230. The processing circuitry 210 may further be provided as at least one application specific integrated circuit (ASIC), or field programmable gate array (FPGA).

Particularly, the processing circuitry 210 is configured to cause the wireless device 200a to perform a set of operations, or steps, S102-S114, as disclosed above. For example, the storage medium 230 may store the set of operations, and the processing circuitry 210 may be configured to retrieve the set of operations from the storage medium 230 to cause the wireless device 200a to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The wireless device 200a may further comprise a communications interface 220 for communications at least with an access node 300. As such the communications interface 220 may comprise one or more transmitters and receivers, comprising analogue and digital components and a suitable number of antennas for wireless communications and ports for wireline communications.

The processing circuitry 210 controls the general operation of the wireless device 200a e.g. by sending data and control signals to the communications interface 220 and the storage medium 230, by receiving data and reports from the communications interface 220, and by retrieving data and instructions from the storage medium 230. Other components, as well as the related functionality, of the wireless device 200a are omitted in order not to obscure the concepts presented herein.

Figure 12:
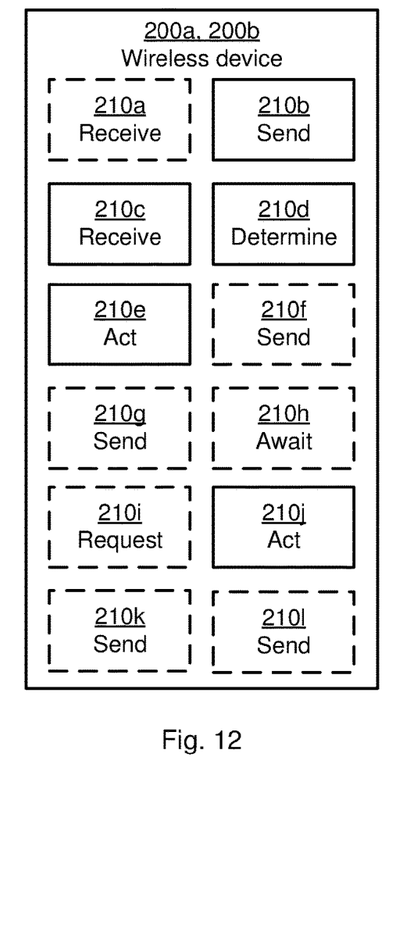
FIG. 12 is a schematic diagram showing functional modules of a wireless device according to an embodiment.

FIG. 12 schematically illustrates, in terms of a number of functional modules, the components of a wireless device 200a according to an embodiment. The wireless device 200a of FIG. 12 comprises a number of functional modules; a send module configured to perform step S104, a receive module 210c configured to perform step S106, a determine module 210d configured to perform step S108, an act module 210e configured to perform step S110, and an act module 210l configured to perform step S112. The wireless device 200a of FIG. 12 may further comprise a number of optional functional modules, such as any of a receive module 210a configured to perform step S102, a send module 210f configured to perform step S110a, a send module 210g configured to perform step S110b, an await module 210h configured to perform step S110c, a request module 210i configured to perform step S110d, a send module 210k configured to perform step S112a, and a send module 210l configured to perform step S114.

In general terms, each functional module 210a-210l may be implemented in hardware or in software. Preferably, one or more or all functional modules 210a-210l may be implemented by the processing circuitry 210, possibly in cooperation with functional units 220 and/or 230. The processing circuitry 210 may thus be arranged to from the storage medium 230 fetch instructions as provided by a functional module 210a-210l and to execute these instructions, thereby performing any steps of the wireless device 200a as disclosed herein.

In some aspects, the wireless device 200a is a low-complexity massive machine type communications (MTC) device. The herein disclosed embodiments thereby enables efficient data transmission on a contention based PDCH for a device category that does not need to have any advanced receiver. According to such aspects the wireless device 200a only needs to implement a receiver that is configured to maintain a synchronization on some common synchronization signal, to estimate channel gain on this signal (or some other channel), and to detect ACK/NACK feedback, and to perform an energy estimate on the ACK/NACK feedback.

Wireless devices being massive MTC (denoted M-MTC or mMTC) devices such as sensors, can thereby be configured to use a contention channel in a non-coordinated way as long as they implements at least steps S104-S112 to avoid multiple collisions. As disclosed above, in some embodiments the wireless devices 200a, 200b perform multiple transmissions where decoding performed by the access node 300 is targeted after multiple such transmissions. In some aspects the wireless device 200a, 200b is configured to use the same resource (unless collision) periodically and thus use a collision-free resource multiple times.

Figure 13:
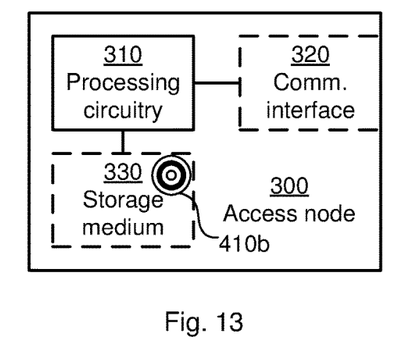
FIG. 13 is a schematic diagram showing functional units of an access node according to an embodiment.

FIG. 13 schematically illustrates, in terms of a number of functional units, the components of an access node 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 410b (as in FIG. 15), e.g. in the form of a storage medium 330. The processing circuitry 310 may further be provided as at least one application specific integrated circuit (ASIC), or field programmable gate array (FPGA).

Particularly, the processing circuitry 310 is configured to cause the access node 300 to perform a set of operations, or steps, S202-S216, as disclosed above. For example, the storage medium 330 may store the set of operations, and the processing circuitry 310 may be configured to retrieve the set of operations from the storage medium 330 to cause the access node 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The access node 300 may further comprise a communications interface 320 for communications at least with wireless devices 200a, 200b. As such the communications interface 320 may comprise one or more transmitters and receivers, comprising analogue and digital components and a suitable number of antennas for wireless communications and ports for wireline communications.

The processing circuitry 310 controls the general operation of the access node 300 e.g. by sending data and control signals to the communications interface 320 and the storage medium 330, by receiving data and reports from the communications interface 320, and by retrieving data and instructions from the storage medium 330. Other components, as well as the related functionality, of the access node 300 are omitted in order not to obscure the concepts presented herein.

Figure 14:
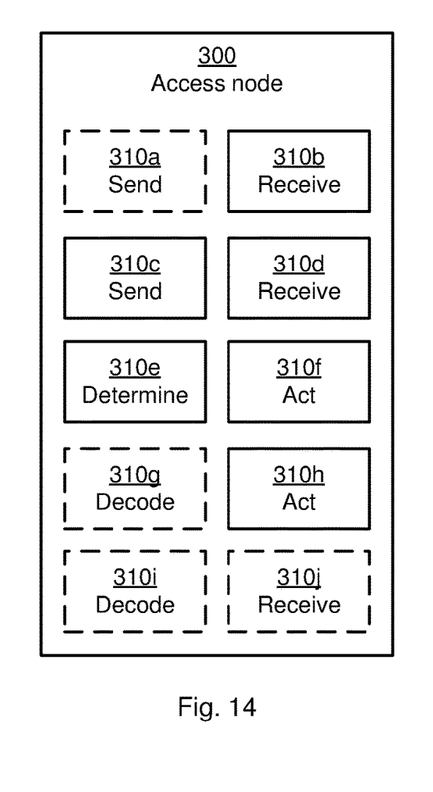
FIG. 14 is a schematic diagram showing functional modules of an access node according to an embodiment.

FIG. 14 schematically illustrates, in terms of a number of functional modules, the components of an access node 300 according to an embodiment. The access node 300 of FIG. 14 comprises a number of functional modules; a receive module 310b configured to perform step S204, send module 310c configured to perform step S206, a receive module 310d configured to perform step S208, a determine module 310e configured to perform step S210, an act module 310f configured to perform step S212, and an act module 310h configured to perform step S214. The access node 300 of FIG. 14 may further comprises a number of optional functional modules, such as any of a send module 310a configured to perform step S202, a decode module 310g configured to perform step S2112a, a decode module 310i configured to perform step S214, and a receive module 310j configured to perform step S216.

In general terms, each functional module 310a-310j may be implemented in hardware or in software. Preferably, one or more or all functional modules 310a-310j may be implemented by the processing circuitry 310, possibly in cooperation with functional units 320 and/or 330. The processing circuitry 310 may thus be arranged to from the storage medium 330 fetch instructions as provided by a functional module 310a-310j and to execute these instructions, thereby performing any steps of the access node 300 as disclosed herein.

The access node 300 may be provided as a standalone device or as a part of at least one further device. For example, the access node 300 may be provided in a radio base station, such as an evolved Node B. Thus, a first portion of the instructions performed by the access node 300 may be executed in a first device, and a second portion of the of the instructions performed by the access node 300 may be executed in a second device; the herein disclosed embodiments are not limited to any particular number of devices on which the instructions performed by the access node 300 may be executed. Hence, the methods according to the herein disclosed embodiments are suitable to be performed by an access node 300 residing in a cloud computational environment. Therefore, although a single processing circuitry 210, 310 is illustrated in FIG. 13 the processing circuitry 310 may be distributed among a plurality of devices, or nodes. The same applies to the functional modules 310a-310j of FIG. 14 and the computer program 420b of FIG. 15 (see below).

Figure 15:
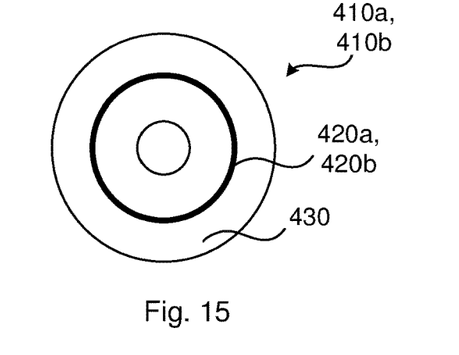
FIG. 15 shows one example of a computer program product comprising computer readable means according to an embodiment.

FIG. 15 shows one example of a computer program product 410a, 410b comprising computer readable means 430. On this computer readable means 430, a computer program 420a can be stored, which computer program 420a can cause the processing circuitry 210 and thereto operatively coupled entities and devices, such as the communications interface 220 and the storage medium 230, to execute methods according to embodiments described herein. The computer program 420a and/or computer program product 410a may thus provide means for performing any steps of the wireless device 200a as herein disclosed. On this computer readable means 430, a computer program 420b can be stored, which computer program 420b can cause the processing circuitry 310 and thereto operatively coupled entities and devices, such as the communications interface 320 and the storage medium 330, to execute methods according to embodiments described herein. The computer program 420b and/or computer program product 410b may thus provide means for performing any steps of the access node 300 as herein disclosed.

In the example of FIG. 15, the computer program product 410a, 410b is illustrated as an optical disc, such as a CD (compact disc) or a DVD (digital versatile disc) or a Blu-Ray disc. The computer program product 410a, 410b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 420a, 420b is here schematically shown as a track on the depicted optical disk, the computer program 420a, 420b can be stored in any way which is suitable for the computer program product 410a, 410b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for data transmission on a contention-based physical data channel (PDCH), the method being performed by a wireless device, the method comprising:
   sending a first data transmission on the contention-based PDCH to an access node;
   receiving a response to the first data transmission from the access node;
   determining a signal strength of the response; and
   acting as if the first data transmission either was collision-free or collided with another data transmission of another wireless device, depending on a comparison between the signal strength and a threshold defined by an expected signal strength of the response.

2. The method of claim 1, wherein the wireless device acts as if the first data transmission was collision-free when the signal strength is higher than the threshold, and wherein the wireless device otherwise acts as if the first data transmission collided with another data transmission of another wireless.

3. The method of claim 1, further comprising:
   receiving, from the access node, a scheduling grant for the wireless device to transmit data on the contention-based PDCH, and wherein the first data transmission is sent according to the scheduling grant.

4. The method of claim 3, wherein the response is an acknowledgment (ACK) protocol message, and wherein acting as if the first data transmission was collision-free comprises:
   sending another first data transmission on the contention-based PDCH to the access node according to the scheduling grant; or
   awaiting another scheduling grant from the access node for the wireless device to transmit data on the contention-based PDCH; or
   requesting another scheduling grant from the access node for the wireless device to transmit data on the contention-based PDCH.

5. The method of claim 3, wherein acting as if the first data transmission collided comprises:
   re-sending the first data transmission as a second data transmission on the contention-based PDCH to the access node according to the scheduling grant.

6. The method of claim 5, wherein the first data transmission comprises a first pilot signal acting as a reference signal and wherein the second data transmission comprises a second pilot signal having a different value than the first pilot signal.

7. The method of claim 6, wherein the value of the second pilot signal is randomly selected, is determined according to the signal strength of the response, and/or is determined based on the first pilot signal.

8. The method of claim 7, wherein the value of the second pilot signal is predicted using the value of the first pilot signal and the signal strength of the response.

9. The method of claim 6, wherein the value of the second pilot signal has a transmission power determined in a range comprising a nominal value, and wherein the transmission power is determined in mutually uncoordinated way between the wireless device and at least one other wireless device.

10. The method of claim 1, wherein the response is either an acknowledgment (ACK) protocol message of the first data transmission or a negative-acknowledgment (NACK) protocol message of the first data transmission.

11. The method of claim 1, wherein the response is a negative-acknowledgment (NACK) protocol message, and wherein acting as if the first data transmission was collision-free comprises:
   re-sending the first data transmission as a second data transmission on the contention-based PDCH to the access node.

12. The method of claim 11, wherein the second data transmission comprises the first pilot signal.

13. The method of claim 1, wherein the first data transmission comprises a first pilot signal acting as a reference symbol.

14. The method of claim 13, wherein the first pilot signal is a demodulation reference signal (DM-RS).

15. The method of claim 13, wherein the response comprises a precoder signal being dependent on the first pilot signal, and wherein the signal strength is determined for the precoder signal.

16. The method of claim 1, further comprising:
   sending a report indicating the signal strength of the response to the access node.

17. The method of claim 16, wherein the report comprises an indication of a difference between the signal strength of the response and the threshold.

18. The method of claim 17, wherein the indication is defined by a signal region, the signal region being selected according to the difference.

19. A method for data transmission on a contention-based physical data channel (PDCH), the method being performed by an access node, the method comprising:
   receiving a first data transmission on the contention-based PDCH from at least one wireless device;
   sending a single response to the first data transmission to the at least one wireless device;
   receiving a second data transmission on the contention-based PDCH from the at least one wireless device;
   determining a correlation between the first data transmission and the second data transmission; and
   acting as if the first data transmission was either received from only a single wireless device or from at least two wireless devices depending on a comparison between the correlation and a threshold.

20. The method of claim 19, wherein the access node acts as if the first data transmission was received from only said single wireless device when the correlation is higher than said threshold, and wherein the access node otherwise acts as if the first data transmission was received from said at least two wireless devices.

21. The method of claim 19, wherein the response is a negative-acknowledgment (NACK) protocol message.

22. The method of claim 19, wherein the correlation is based on a channel estimate of the first data transmission and a channel estimate of the second data transmission.

23. The method of claim 19, wherein the first data transmission comprises a first pilot signal acting as a reference symbol, and wherein the second data transmission comprises a second pilot signal also acting as said reference symbol.

24. The method of claim 23, wherein the channel estimate of the first data transmission is based on the first pilot signal, and wherein the channel estimate of the second data transmission is based on the second pilot signal.

25. The method of claim 23, wherein the response comprises a precoder dependent on the first pilot signal.

26. The method of claim 25, wherein acting as if the first data transmission was received from said at least two wireless devices comprises:
decoding said data using said data of the second data transmission and without using said data of the first data transmission.

27. The method of claim 19, wherein the first data transmission comprises data, and wherein the second data transmission also comprises said data.

28. The method of claim 27, wherein acting as if the first data transmission was received from said single wireless device comprises:
decoding said data using a combination of said data of the first data transmission and said data of the second data transmission.

29. The method of claim 19, further comprising:
sending a scheduling grant for the at least one wireless device to transmit data on the contention-based PDCH, and wherein the first data transmission and the second data transmission is received according to the scheduling grant.

30. The method of claim 19, further comprising:
receiving a report from at least one of the at least one wireless device, the report indicating a signal strength of the response to the first data transmission.

31. A wireless device for data transmission on a contention-based physical data channel (PDCH), the wireless device comprising:
processing circuitry; and
a computer program product storing instructions that, when executed by the processing circuitry, causes the wireless device to:
send a first data transmission on the contention-based PDCH to an access node;
receive a response to the first data transmission from the access node;
determine a signal strength of the response; and
act as the first data transmission either was collision-free or collided with another data transmission of another wireless device, depending on a comparison between the signal strength and a threshold defined by an expected signal strength of the response.

32. An access node for data transmission on a contention-based physical data channel (PDCH) the access node comprising:
processing circuitry; and
a computer program product storing instructions that, when executed by the processing circuitry, causes the access node to:
receive a first data transmission on the contention-based PDCH from at least one wireless device;
send a single response to the first data transmission to the at least one wireless device;
receive a second data transmission on the contention-based PDCH from the at least one wireless device;
determine a correlation between the first data transmission and the second data transmission; and
act as if the first data transmission was either received from only a single wireless device or from at least two wireless devices depending on a comparison between the correlation and a threshold.

* * * * *